Patented Oct. 10, 1939

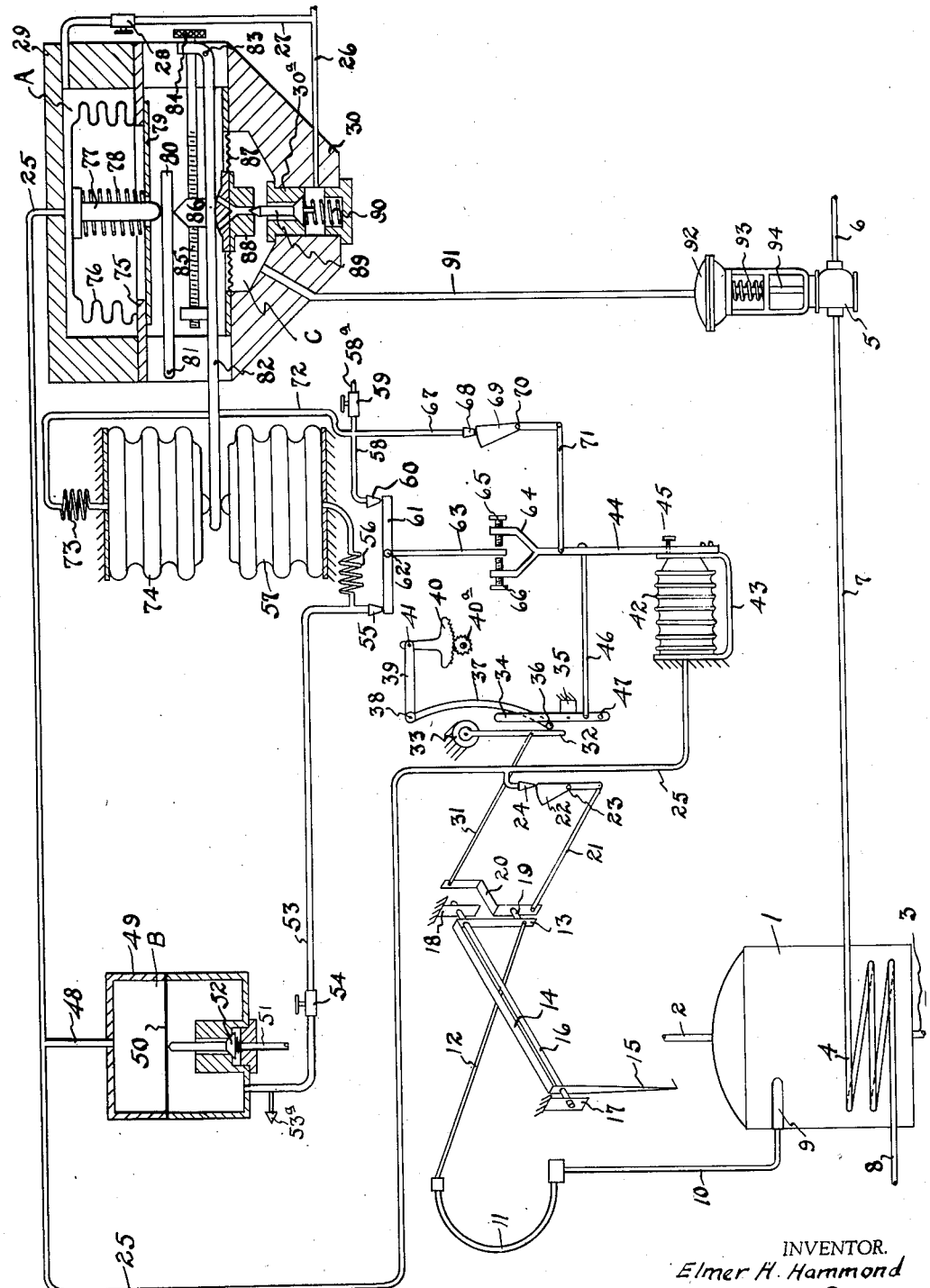

2,175,351

UNITED STATES PATENT OFFICE 2,175,351

CONDITION CONTROLLER

Elmer H. Hammond, Southport, Conn., assignor, by mesne assignments, to Manning, Maxwell & Moore, Inc., New York, N. Y., a corporation of New Jersey Application January 21, 1937, Serial No. 121,530

13 Claims. (Cl. 236—82)

This invention relates to improvements in apparatus known as condition controllers, such as temperature, pressure, flow or speed controllers, for maintaining predetermined set values of the controlled condition.

The features of this invention are applicable to any type of condition controller which upon a deviation from a predtermined controlled datum utilizes a fluid under pressure for actuating a servo-motor, which upon actuation applies a corrective or restoring action to the system being controlled, this corrective action serving to bring the controlled condition back to the predtermined datum. While the fluid under pressure may be either a liquid or gas the preferred fluid is compressed air and the following description will assume that compressed air is being used as a pressure fluid.

The full nature of the invention will best be understood by a detailed reference to one form of mechanism embodying the features of this invention as illustrated in the attached drawing by way of example, and described in the following specification.

This invention resides substantially in the combination, construction, arrangement and relative location of parts, all as will be described in detail below.

The full scope of the objects sought by this invention will be explained below.

In the accompanying drawing, the single figure is a more or less diagrammatic view with some parts in cross-section of an apparatus in accordance with this invention employed for controlling the conditions within a heating apparatus.

In order that the full advantages of this invention be appreciated, a brief description and summary of some of the major characteristics of condition controllers is given. A "throttling control" is well understood in the art and may be defined as a type of condition control in which the fluid pressure in the servo-motor bears a definite ratio to the amount the controlled condition has deviated from the desired control point. By way of example, assuming a temperature controller of the throttling type, the temperature must deviate from the set or control point before the controller can change the pressure on the diaphragm of the servo-motor which operates the control valve and thus actuate the control valve to correct or stop further deviation by controlling the flow of a heating or cooling medium to the heat exchange apparatus being controlled. The degree of throttling is variously known as "throttling range", control band, sensitivity, and the like. These terms all have the same meaning, that is, the total deviation or change in the controlled condition necessary to cause full travel of the control valve. If a control temperature had to change say 10° to cause full valve travel, then the throttling range would be 10°, which can and is commonly expressed as a per cent of the total range.

It is desirable to provide a throttling range in a condition controller to permit the characteristics of the condition controller to be synchronized with the time lag of the system being controlled. This so-called time lag denotes the time which elapses between a corrective action of the control mechanism and the result of that action on the sensitive element of the condition controller. Thus in a temperature controller a change in temperature may occur at the temperature sensitive element due, for example, to a change in load in the heat exchange apparatus. This change in temperature is picked up by the thermometer system and relayed to the control valve in the form of a change in air pressure on the diaphragm of the motor operator. The control valve will then be operated an amount proportional to the change in temperature assuming that that change is not so great as to call for full valve travel. The flow of heating or cooling medium to the heat exchange apparatus will as a result change but it will require time for the first effect of this change in flow to be detected by the temperature sensitive element at which time the controller will cause the control valve to travel in a direction opposite to its original movement. It is apparent that a deviation from the control point must occur before the condition controller can apply a corrective action. Therefore, if the condition controller has too narrow a throttling range there will be a tendency for the controller to over-correct, providing there is a measurable time lag in the control system. It is desirable, therefore, to include in the condition controller enough flexibility to provide for quick and easy field adjustments which will permit variation of the throttling range so that it may be synchronized with the time lag of the controlled system.

Another characteristic of apparatus of this type is the "drift" which is inherent in every throttling type of condition controller. "Drift" may be defined as the amount the controlled condition deviates either side of the desired and predetermined control point. For example, assume a temperature controller maintaining the temperature of a tank of liquid by throttling the flow of steam to closed heating coils in the tank and assume that the process is continuous, that is, there is a continuous flow of material being treated into and out of the tank. Further assume that the system is in equilibrium, that is, the temperature of the incoming and outgoing liquid and the rate of flow of liquid are momentarily constant. These three factors determine the heating load ignoring radiation losses. Since the heat load is constant under the assumed conditions the flow of steam to supply that load will be constant and the steam control valve will be open an amount just sufficient to supply the required steam flow. Let it be assumed that the diaphragm pressure range of the servo-motor of the control valve is zero to sixteen pounds per square inch, or, in other words, that the diaphragm motor requires a change from zero to sixteen pounds per square inch in the pressure of the operating fluid to cause full valve travel. For any intermediate pressure the valve travel will be nearly proportional thereto. Now assume that the diaphragm pressure is eight pounds and the steam control valve is half open for the above conditions of steady steam flow. If the throughput of liquid being treated increases, the new flow requires additional steam in the heating coils. Let us assume that this change requires that the control valve must be three-quarters open instead of one-half open. This change in valve opening requires that the air pressure to the servo-motor must change. However, in a system of this type this change in air pressure cannot occur until the temperature sensitive element has been affected. This occurs because the new load conditions establish a new temperature condition in the heat exchange apparatus. This new temperature will be of such a value as to cause the steam control valve to move an amount which will satisfy the new load conditions. It is apparent, however, that there is a different and definite temperature for each valve position. The total variation in temperature for full valve travel will be the throttling range and the amount the temperature deviates from the set control point for a given heat load or valve opening is known as the "drift". Obviously, if the load variations were such that the control valve had to work between a fully closed and a fully open position the total drift would equal the throttling range, which is another way of saying that the amount of drift will depend upon the throttling range and on the load changes.

Obviously, drift is an undesirable characteristic of condition controllers. The present invention applied to throttling condition controllers compensates for the drift so that the controller will automatically re-set itself to return to the predetermined control point for any load change which is within the capacity of the control mechanism, such as the control valve. The system illustrated in the drawing is but one embodiment of the invention provided for the purpose of illustrating it. More specifically, it is a condition controller of the temperature sensitive type controlling the flow of steam to a tank in which a continuous but variable flow of liquid is heated.

The mechanism and its connection will be first described before giving a description of its operation. It is to be noted that there are several ways of providing for an adjustable throttling range, all of which are well known in the art. The method employed in the system disclosed is such that the controlled air pressure is utilized to operate devices in such a way as to require a greater movement of the air control valve than would be required if said devices were not used. This will be clear later.

The system as illustrated in the drawing shows a tank or retort 1 representing the heating type of heat exchange apparatus although the system may be equally well applied to a refrigerating apparatus. This tank is provided with the material supply connection 2 and outlet 3 so that the material being treated may be passed continuously, if desired, through the retort. At 4 is illustrated a heater for the retort in the form of a steam coil which is supplied with steam from the source through pipe 6, valve 5, and pipe 7. The connection 8 is for the exhaust of steam to waste or other use. At 9 is the temperature sensitive bulb mounted within the retort and in a position to be subject to the temperature changes therein. It is connected by a capillary tube 10 to a Bourdon tube or spring 11. This spring is connected by means of a link 12 to the movable mechanism of a temperature recording device of any suitable form. This mechanism has been illustrated as comprising a U-shaped member composed of the portions 13, 14 and 15 pivotally mounted on a shaft 16 supported in the bearing members 17 and 18. The arm 15 represents the pen arm of the recording instrument by means of which a continuous record of the temperature changes in the retort is made on a moving dial, as is well known in the art.

Secured to the arm 13 is a pivot pin 19 on which is pivotally mounted an arm 20. This arm is pivotally connected by a link 21 to a segmental member 22 which is pivotally supported on the fixed pivot pin 23. This segmental member is mounted to move closely adjacent to the discharge orifice of the nozzle 24 which is connected to a pipe 25. This pipe extends to the chamber A in the relay device 29, 30. This chamber is provided with air under pressure by means of a pipe 26 extending from a suitable air pressure source and a branch connection 27 through the adjustable needle valve 28.

Lever 20 is also pivotally connected by link 31 to a lever 32 pivotally supported on the fixed pivot support 33. It is to be noted that the pivotal connection of the link 31 to the lever 20 is in the axis of shaft 16 if extended. Pivotally mounted on the support 35 is a lever 34 arranged so as to be in parallel plane as and adjacent to the lever 32. At 36 is a fulcrum pin mounted on the end of a lever 37 which is pivotally connected to the arm 39 which is fixed to a segmental gear member 40 pivotally mounted at 41. A small adjustable gear 40ᵃ meshes with the teeth of the member 40 and may be rotatably adjusted so as to swing the member 40 on its pivot pin 41 causing lever 39 to swing up and down, carrying lever 37 with it and thereby raising and lowering the fulcrum pin 36 so as to relatively position it with regard to levers 32 and 34.

Pipe 25 is connected at one end to a bellows or Sylphon 42 which is mounted on a leaf spring bracket 43 so that the leaf spring 43 tends to restrain the expansion and contraction of the bellows. At 44 is an arm secured at its lower end to the spring 43 and initially positionable with respect thereto by means of the micrometer screw 45 which bears on the leaf spring 43.

Arm 44 is pivotally connected by means of a link 46 to the lever 34. The pivot pin represents another point by which the lever 34 may be pivotally mounted on the support 35 by a quick adjustment when necessary.

Pipe 25 is also connected by a branch 48 to the chamber B of a relay 49. This relay comprises a casing which is closed off to form the chamber B by means of a flexible diaphragm 50 which is positioned to engage the stem of valve 52 which is normally held on its seat by a spring as shown. A pipe 51 connected to any suitable source of air supply opens into the small chamber below the seated valve 52. The pipe 53 extends from the chamber below the diaphragm 50 to a nozzle 55 having a discharge orifice. In the pipe 53 is an adjustable needle valve 54 and a small fixed fluid port 53ª. Pipe 53 is also connected through a capillary choke coil 56 to an expansible bellows or Sylphon 57. Pipe 58ª also extending from a suitable air supply has therein an adjustable needle valve 59 and is connected to pipe 67. This pipe is provided with a connection 58 to the nozzle 60 having a discharge orifice. Nozzles 55 and 60 are positioned in the same plane and opposite a lever 61 which is pivotally mounted at 62 and has an integral depending arm 63. The lower end of this arm lies between the adjustable set screws 65 and 66 mounted on the forked end 64 of lever 44.

Pipe 67 terminates in a nozzle 68 having a discharge orifice positioned adjacent the curved face of the segmental valve member 69 which is pivotally mounted at 70 and pivotally connected by a link 71 to arm 44. Pipe 67 also connects to an expansible bellows or Sylphon 74 through a capillary choke coil 73. The bellows 57 and 74 are longitudinally aligned and positioned in opposition to each other with their outer ends secured to fixed supports as shown and their inner ends free to move.

The relay comprising the casing parts 29 and 30 has the closed chamber A formed therein by means of a partitioning disc 75 to which is sealed a bellows or Sylphon 76, the upper end of which is free to move. Mounted on the bellows is a depending pin 77 and a spring 78 surrounds it and is interposed between the bellows and a disc 79 mounted on the undersurface of the disc 75. The pin 77 engages a lever 80 pivotally mounted at 81 on the relay casing. A lever 82 pivotally mounted on the casing at 83 extends between the ends of the bellows 57 and 74. Rotatably mounted on the lever 82 is a threaded screw 85 having the thumb-head 84. At 86 is an adjustable fulcrum member having a threaded passage so that it may be mounted on the screw 85 and moved back and forth by rotating the screw. This fulcrum member 86 is positioned to engage the lever 80.

The lower portion 30 of the relay has a chamber C formed therein by means of a flexible diaphragm 87 mounted thereon. This diaphragm has a button 88 secured at the center thereof and is provided with passages therethrough as shown. This button engages the lever 82. At 89 is a double valve member normally held on its seat in the bushing 30ª by means of a spring 90. Chamber C is connected by a pipe 91 to the diaphragm chamber of a servo-motor 92 of any suitable construction. This motor actuates the valve stem 94 of the valve 5 against a spring 93 which normally tends to open the valve, said valve being of the type which seats by movement of its disc in a downward direction. This the spring 93 is always tending to open the valve against the action of the servo-motor which tends to close it, all in accordance with well known principles in this art. It will be understood, by those skilled in the art, that the system may be employed with the valve 5 acting reversely, i. e., a valve in which spring 93 normally acts to close the valve and the pressure in 92 to open it.

A description of the operation of this mechanism will now be given.

Changes in temperature within the retort 1 will affect the pressure in the system comprising the bulb 9, connection 10 and Bourdon tube 11 so that the Bourdon tube will expand or contract. This motion is carried by the link 12 to the pen arm mechanism so that it will pivot on the shaft 16. So as to understand more clearly the action of the apparatus, it will be assumed that the arm 20 is in neutral position. The pivot point of connection of link 31 therewith will be in the axis of shaft 16 when extended. If it is assumed for the moment that shaft 16 and arm 20 are connected at this point, they will move together so that the movement of arm 13 by reason of the expansion or contraction of the Bourdon tube 11 will cause arm 20 to move a similar amount with the result that the valve segment 22 is moved about its pivot point 23 by the link 21. Thus the valve segment 22 will be positioned with respect to the nozzle 24 to more or less cut off the discharge of air therefrom with the result that a pressure will build up or fall in the pipe 25. If it is assumed, for example, that the temperature condition in the retort 1 is such that the valve segment 22 completely closes the nozzle 24 then a maximum pressure will build up in pipe 25. If now it is assumed that there is no connection between shaft 16 and lever 20 but that they are relatively free as disclosed in the drawing and that the upper end of lever 20 swings in a counterclockwise direction, the lower end will swing in a counterclockwise direction tending to move valve sector 22 away from the nozzle to partly uncover it. This is really what occurs with the mechanism shown when the Bourdon spring moves the linkage in a direction so that the valve sector 22 moves to cover the nozzle; which is to say that the other linkage comprising the lever 20 pivotally mounted on arm 13 tends to move the valve sector 22 in the opposite direction with the result that it will take a greater movement of the mechanism by the Bourdon spring to completely cover the nozzle than would be the case if the compensating linkage were not employed.

Reference will now be made to the bellows 42 and its linkage. With the nozzle 24 partially covered so that there will be a pressure in pipe 25 and in bellows 42 of 8 pounds, the lever 44 is adjusted by the micrometer screw 45 so that the pivot point of connection between the link 31 and lever 20 is in the axis of shaft 16 extended. With the mechanism as shown, an increase in temperature will rotate the pen arm mechanism in a clockwise direction and this will cause valve sector 22 to rotate in a clockwise direction. When the sector 22 just begins to throttle the discharge from nozzle 24 some pressure will build up in pipe 25 and bellows 42 and in chamber B of the relay 49 as well as in chamber A of relay 29. The pressure in chamber A will compress bellows 76, and its movement, acting through pin 77, lever 80, fulcrum 86, lever 82, and button 88, will cause valve 89 to unseat so that air may flow from pipe 26 into chamber C and from there through pipe 91 to the servo-motor chamber 92. The servo-motor will thereupon partially close the valve 5, reducing the supply of steam to the heating coil 4.

Simultaneously with this action the same pressure in bellows 42 will expand it to cause arm 44 and link 46 to rotate arm 34 in a counterclockwise direction about its pivotal support point. This motion transmitted through fulcrum pin 36, lever 32, and link 31 will cause arm 20 to rotate in a counterclockwise direction about the pivot pin 19 to produce the compensating action described above, or, in other words, to cause a partial compensating or return movement of the valve sector 22 in a direction opposite to that which the expansion of Bourdon tube 11 caused.

It will be seen that the covering of nozzle 24 by 22 builds up a pressure in the mechanism as described above which tends to uncover the nozzle and decrease the pressure. Such a system, it will be seen, is inherently stable, for the retarding action of bellows 42 can never equal the primary action which tends to cover the nozzle. Thus the controlled pressure is utilized to widen the throttling range (of 22—24 which in the form usually employed has a fixed throttling range) by causing the temperature responsive elements to move further to cover the nozzle 24 than they would have to move otherwise.

The function of the levers 32, 34 and 37 controlled by the pinion 40ª and geared segment 40 is to permit easy adjustment of the width of the throttling range. It is apparent that the bellows 42 will always deflect the same amount for a given internal pressure. Therefore, if it is desired to increase or decrease the throttling range the motion of arm 32 must be varied. This is done by moving the fulcrum pin 36 up or down by rotating pinion 40ª, which in turn rotates the geared segment 40, raising or lowering the outer end of lever 39 and as a result raising or lowering the fulcrum pin 32 and thereby changing the relative effective lengths of the levers 32 and 34. Thus, if the fulcrum pin 36 is lowered the motion of arm 32 is decreased for a given motion of the bellows 42 with the result that the throttling range is narrowed. A reverse movement of the fulcrum 36˚ will increase the throttling range. Those skilled in the art will appreciate that other specific forms of mechanism may be employed for adjusting the linkage mechanism to secure the same result of changing the throttling range of the sector and nozzle mechanism 22—24. Those skilled in the art will understand that this particular part of the mechanism represents the equivalent of a relay of the type shown at 29—30.

The mechanism as shown is such that an increase in temperature at the bulb 9 will cause 22 to throttle nozzle 24 and increase the pressure in the diaphragm of the servo-motor 92. It may be desired to obtain a reverse action, that is on an increase of temperature at the bulb 9 to uncover the nozzle 24 and decrease the air pressure in the servo-motor 92. This may be easily done by positioning the sector 22 with respect to the pivot point 23 so as to be on the other side thereof so that the opposite end is under the nozzle with the rest of the mechanism in the position shown, i. e., by simply re-positioning sector 22 with respect to the nozzle so as to be at the other side thereof. An increase in temperature will then cause 22 to uncover the nozzle. In this case, of course, lever 34 will then need to be pivoted on the support 35 at the pivot point 47.

All of the above described is more or less old in the art as shown, in part at least, in the copending application of Hammond et al., Serial No. 18,382, filed April 26, 1935, now Patent No. 2,073,838, dated March 16, 1937; Beck Patent No. 2,044,461, granted June 16, 1936; the patent to Comfort No. 837,260, dated November 27, 1906; and the patent to Atwood No. 636,884, dated November 14, 1899.

The part of the mechanism the operation of which will now be described is believed to be in itself new and to be new in combination with the previously described mechanism.

Relay 29 is similar in many respects to that disclosed in Hammond and Beck application Serial No. 18,382, mentioned above, with the exception that the boosting ratio of the relay in this case must be one to one so that for every increase in pressure in chamber A there will be approximately an equal increase in chamber C. Thus the diaphragms 76 and 87 can be so proportioned as to produce a one to one ratio and the compound leverage is replaced by the single lever 82 with the pin 77 extended to bear on 82. The relay 49 is provided to maintain a pressure in pipe 53 between the needle valve 54 and the relay the same as that in pipe 25 and bellows 42. Therefore, the boosting ratio of relay 49 must also be one to one, in which case the same pressure will exist in these pipes. The needle valve 54, or an equivalent restricting means, limits the flow of air to pipe 53 which is connected through the choke coil 56 to the bellows 57. The restriction 59 in the air supply pipe 58 limits the amount of air that can flow into the branches 58, 67 and 72. The area of bellows 57 and its distance from the pivot point 83 are selected so that for equal pressure in 57 and in chamber A the resultant moment on arm 82 will be zero. The area of bellows 74 is the same as the area of bellows 57.

Let us now assume a direct acting instrument and a direct acting valve 5 where, as described above, an increase of temperature increases the air pressure in the diaphragm of the motor 92 where such increase tends to close valve 5 against the action of spring 93. Let the throttling range of the controller be 20% of the scale range of the indicator and recorder operated by the Bourdon tube 11, that is, 10% above and 10% below the set control point. Assume the liquid in the tank is being heated and the control valve 5 is wide open. As the temperature in the retort 1, that is, of the liquid therein, reaches a point 10% below the set point, valve member 22 will be moved to a position to start building up pressure in the line 25, and the same pressure will build up in the diaphagm chamber 92 so that the control valve 5 will start to control. The members 22 and 24 are so related that when the temperature reaches the control point the pressure in line 25 and bellows 42 will be 8 pounds. Now for any pressure in pipe 25, and hence in chamber A and bellows 42 below a predetermined value, of say 7¾ pounds per square inch, the arm 44 and adjusting screw 65 are so set that nozzle 55 is completely covered and nozzle 60 is uncovered; between 7¾ pounds per square inch and 8¼ pounds per square inch, both nozzles 55 and 60 are uncovered; and from 8¼ pounds per square inch to 16 pounds per square inch, nozzle 60 is fully covered, adjusting screw 66 being properly adjusted, and nozzle 55 is uncovered.

Hence so long as the pressure in bellows 42 is less than approximately 8 pounds, nozzle 55 is closed and the pressure in pipe 53 will be the same as in bellows 42. The choke coil 56 will allow the pressure to build up very slowly in bellows 57. Each pound of pressure that builds up in bellows 57 offsets or cancels the same amount of pressure in chamber A and this decreases the pressure in pipe 91 by the same amount. Thus once the temperature reaches the lower part of the throttling range the action of the condition controller will be such as to insure that the control valve 5 must remain open enough to build up the pressure in bellows 42 to at least 8 pounds per square inch. For if the temperature tried to remain constant at any value below the control point the pressure in chamber A of the relay also would have to remain constant at a corresponding value but during this time pressure would be slowly building up in bellows 57 to lower the pressure in pipe 91 and thus open the control valve to further raise the temperature and increase the pressure in bellows 42. Since the pressure in bellows 57 can build up to the same value as the pressure in chamber A, the resultant moment on arm 82 can become zero and the pressure in pipe 91 could be reduced to zero, thus opening valve 5 wide, if that be necessary, to raise the temperature to the control point. It is apparent then that the temperature can never level off below the control point, which is equivalent to the pressure of 8 pounds per square inch, in bellows 42.

The above discussion is concerned with temperature conditions which would not go above the control point. The operation will be described when the temperature does go above the control point after first considering the function of the valving mechanism 68, 69. The relative position of these members is set so that when the pressure in bellows 42 is zero, 69 will just cover nozzle 68 to build up a pressure in lines 58, 67 and 72 approximately equal to the supply pressure from pipe 58ª of 16 pounds per square inch. Likewise, when the pressure in 42 is 16 pounds per square inch, 69 will have just uncovered nozzle 68 and the pressure in pipes 58, 67 and 72 will be zero. For any intermediate pressure in bellows 42 the sum of the pressure therein and the pressure in pipes 58, 67 and 72 will equal the initial supply pressure which, as assumed, is 16 pounds per square inch. It might here be noted that there are other equivalent mechanisms to the throttling arrangement 68, 69, which could be employed in place thereof, such as a relay similar to the relay 49 except that it would be built so that the discharge pressure from the relay plus the pressure in bellows 42 would always approximately equal 16 pounds per square inch.

Assuming now that the temperature goes above the control point, it will be noted that the pressure in bellows 42 will be a direct measure of how far the temperature is above the control point and that at the control point the pressure in bellows 42 has been selected for illustration as 8 pounds per square inch. Therefore, when the temperature goes above the control point the pressure in bellows 42 will go above 8 pounds per square inch. This will open nozzle 55 and close nozzle 60. However, for a pressure of 8 pounds per square inch in bellows 42 the member 69 will be throttling nozzle 68 attempting to build up an 8 pound pressure in pipes 58, 67 and 72, but nozzle 60 prevents this.

It is important to note again that 22—24 and 68—69 are differentially acting, that is when nozzle 24 is completely closed, nozzle 68 is fully open and when nozzle 24 is fully open, nozzle 68 is fully closed. Under the former condition the pressure in pipe 25 is 16 pounds and in pipes 67 and 72 it is 0 pounds, and for the latter condition the pressure in 25 is 0 pounds and in 67 and 72 it is 16 pounds. The same relation holds for intermediate conditions so that the sum of the pressures in pipes 25 and 72 is always 16 pounds when nozzle 60 is closed.

Therefore, when nozzle 60 is first closed the pressure in pipe 72 will build up to at least 8 pounds per square inch and air will gradually flow through the choke coil 73 to build up the pressure in bellows 74. Because of the fact that bellows 57 and 74 are matched, each unit of pressure in 74 is equivalent to an additional unit in chamber A. Therefore, each unit of pressure in 74 will produce an additional unit of pressure in pipe 91.

Now, suppose the temperature went 5% above the control point and tried to stay there. The pressure in bellows 42 would be 12 pounds per square inch and the pressure in pipe 72 would be 4 pounds per square inch, the sum of which equals 16 pounds per square inch. Eventually 4 pounds of pressure will build up in bellows 74 and add its effect to the 12 pounds in the chamber A so that the equivalent effect would be the same as having 16 pounds pressure in the chamber A. Under these conditions valve 5 will be completely closed cutting off the supply of steam to coils 4 and the temperature in retort 1 will start falling rapidly. As the temperature falls, the pressure in A will drop under the control of 22—24 thus decreasing the pressure in 92 to partially open valve 5 and check any rapid drop in temperature. If the temperature does not drop to the control point pressure will build up slowly in 74 to close valve 5 until the temperature does drop to the control point. The drop of pressure in A is partially offset by the increase in pressure in 74. The result is that valve 5 does not open so rapidly and as the temperature approaches the control point the rate at which valve 5 opens decreases so that the temperature levels off at the control point. The modifying action of 74 will depend on the rate at which the temperature drops and the choking characteristics of choke coil 73.

It should be noted that the pressure in 72 is fully determined by the pressure in A. Thus the pressure in 74 can never increase to a value which prevents a change in pressure in A from causing a corresponding change in 92 to effect a change in opening of valve 5.

From the above description it will be seen that this system will tend to adjust itself to maintain a pressure of 8 pounds per square inch in bellows 42. When the pressure in bellows 42 is 8 pounds per square inch the temperature is at the control point. Therefore, the pneumatic system will tend to adjust itself so that the temperature will always tend to come back to the control point.

The following discussion, it is believed, will be helpful in further fully understanding the operation of the system. In the above discussions it was of course assumed that the control valve 5 is large enough to handle the maximum load. Let us now assume a heavy load, that is, a large throughput of material being treated in the retort so that the control valve must be wide open to bring the temperature to the control point. Because of the throttling range the valve will start closing at a temperature a definite number of degrees below the control point. Assume that the throttling range is 16°, that is, 8° above and 8° below the control point. To further simplify the illustration, assume that the total range of the apparatus is 16°, or, in other words, that the throttling range is 100%. Because the throttling range is 100%, the air pressure in bellows 42 will be directly proportional to the temperature in the retort. Thus at 0° the pressure in 42 will be zero, at 8° the pressure will be 8 pounds, and at 16° the pressure will be 16 pounds. Therefore, the valve starts closing at 0°. At 4° the valve will be one-quarter closed if bellows 57 were not in use, but because of the heavy load it might be possible that with the valve 5 one-quarter closed sufficient heat could not be supplied to raise the temperature above 4° in the retort. Therefore, the temperature would level off at 4° instead of at the control point of 8°. Assume now, however, that the bellows 57 is used. The pressure in 53 will be 4 pounds (the same as in bellows 42). Thus a pressure will start building up in 57 at a rate depending upon the characteristics of the choke coil 56. The pressure in pipe 91 at any instant will be equal to the algebraic sum of the differential pressure between bellows 57 and 74 and the pressure in chamber A. If the pressure in 57 is greater than the pressure in 74 the sign of the pressure differential will be minus, and if the pressure in 74 is greater than in 57 the sign of the pressure differential will be plus. Therefore:

$$P_{91} = P_A + (P_{74} - P_{57})$$

Also:

$$P_A = P_{42}$$

In the above example, $P_{74}$ is 0. Therefore:

$$P_{91} = P_A - P_{57}$$

Naturally, as $P_{57}$ increases, $P_{91}$ will decrease, and the valve will open to supply more steam. This will raise the temperature in the retort and hence the pressure in chamber A, thus tending to momentarily hold back a sudden rise in temperature. The temperature, however, must increase to the control point. Let us now assume an example where the heat load is light, that is, the throughput to the retort is small, leaving all the other factors in the above example the same. Valve 5 is wide open at 0°. Because of the light load it will be assumed that the temperature in the retort will rise so rapidly that there will not be time for pressure to build up in bellows 57 and the temperature will go above the control point. As the pressure in 42 goes above 8 pounds per square inch, nozzle 60 will close, but the temperature continues to rise so rapidly that pressure does not have time to build up in 74. It is apparent that under such conditions the temperature in the retort will go beyond the control point but will finally come back to equilibrium at the control point. By widening the throttling range this tendency to over-shoot will be decreased.

In actual operation with a properly designed equipment in relation to the loads being handled and with the system in equilibrium, the actual control point will float at approximately 8 pounds per square inch to throttle either nozzle 55 or 60 or both. The actual pressure in 91 and hence in the diaphragm chamber 92 will depend on the differential pressure between 74 and 57, and this differential pressure will be determined by the throttling action of nozzles 55 and 60. Thus for a pressure of 8 pounds in 42 and in chamber A the pressure in pipe 91 may have any value between 0 and 16 pounds per square inch.

From the above description it will be apparent that the principles of this invention may be embodied in other physical combinations and carried out in other ways without departing from the true scope of the novel subject matter herein disclosed. I do not, therefore, wish to be limited to the illustrative disclosure, but rather to the scope of the claims granted me.

What is claimed is:

1. In a pressure fluid operated control system of the supply and waste type for controlling the supply of a conditioning agent, a control couple comprising a pair of relatively movable elements, one fixed and one movable, one a ported element and the other a valve element, means subject to variations in a variable condition for causing relative movement between the elements of the control couple, a pressure fluid system for which the ported element is a vent, pressure fluid operated means to control the flow of the conditioning agent, a pressure fluid supply pipe connected to said pressure fluid operated means having a valve therein, a pressure responsive member connected to said system for operating said valve, and fluid pressure operated means acting on said valve and subject to variation in pressure in the system to regulate the pressure in said pipe to any value between zero and a maximum for a substantially fixed pressure in said system.

2. In a pressure fluid operated control system of the supply and waste type for maintaining a variable condition at a set value by controlling the flow of a conditioning agent, a control couple comprising a pair of relatively movable elements, one fixed and one movable, one a ported element and the other a valve element, means subject to variations in a variable condition for causing relative movement between the elements of the control couple, a pressure fluid system for which the ported element is a vent, pressure fluid operated means to control the flow of the conditioning agent, a pressure fluid supply pipe connected to said pressure fluid operated means having a valve therein, a pressure responsive member connected to said system for operating said valve a pair of pressure responsive members arranged to act on said valve to aid or oppose the pressure responsive member, and means subject to variation in the pressure in the system for controlling the pressure in said pair of members.

3. In a pressure fluid operated control system of the supply and waste type for controlling the flow of a conditioning agent, a control couple comprising a pair of relatively movable elements, one fixed and one movable, one a ported element and the other a valve element, means subject to variations in a variable condition for causing relative movement between the elements of the control couple, a pressure fluid system for which the ported element is a vent, pressure fluid operated means to control the flow of the conditioning agent, a pressure fluid supply pipe connected to said pressure fluid operated means having a valve therein, a pressure responsive member connected to said system for operating said valve, a pair of pressure responsive members arranged to act on said valve to aid or oppose the pressure responsive member, and means subject to variation in the pressure in the system for selectively controlling the pressure in said pair of members.

4. In a control system as described, the combination including a pressure fluid system for controlling the flow of a conditioning agent, a control couple comprising a pair of relatively movable elements, one fixed and one movable, one element forming a vent for the system and the other a valve for the vent, means subject to variations in a variable condition to be maintained at a set value for effecting relative movement of the elements of the control couple to vary the pressure in the system, fluid pressure operated means for controlling the flow of the conditioning agent, a pressure fluid connection to said means, a pressure responsive valve in said connection operated by variations in pressure in said system for controlling the pressure in said connection, and means subject to variations in the pressure in said system for modifying the control by said pressure responsive valve of the pressure in said connection whereby there is a substantially fixed pressure in the system which corresponds to the set value of the condition to be maintained for all rates of flow of conditioning agent.

5. In a system as described, the combination including a primary and a secondary pressure fluid system, a pair of control couples each comprising a pair of relatively movable elements, one element of each pair forming vents for said systems respectively and the other element of each pair a valve for the vents respectively, means operated by variations in a condition to be maintained at a set value for effecting relative movement of the elements of the control couple of the primary system to vary the pressure in that system, fluid pressure operated means for controlling the flow of a conditioning agent, a pressure fluid connection to said means, a pressure actuated valve in said connection operated by changes in pressure in said primary system, means operated by variations in pressure in that system to effect relative movement of the elements of the other couple to vary the pressure in the secondary system, and pressure actuated means connected to the secondary system and also controlling the pressure actuated valve to modify its control of the pressure in said connection, whereby the sum of the pressures in the two systems always tends to equal a fixed value when the vent of the couple in the second system is closed.

6. In a pressure fluid operated control system of the supply and waste type, for maintaining a variable condition at a set value, the combination including a first fluid pressure system, a control couple therefor comprising a pair of relatively movable elements, one a ported element and the other a valve element, the ported element providing a vent for said system, means subject to variations in a variable condition for causing relative movement between the elements of the control couple, pressure fluid operated means to control the flow of a conditioning element, a second fluid pressure system connected to said pressure fluid operated means, a valve in said second system, a first pressure responsive device in said first system for operating said valve, a third fluid pressure system, a second pressure responsive device connected to said third system, fluid pressure operated means connected to said first system for controlling the pressure in said third system, a fourth fluid pressure system, a third pressure responsive device connected to said fourth system, and means connected to said first system for controlling the pressure in said fourth system, said second and third pressure responsive devices arranged to act on said valve in opposite directions.

7. In a pressure fluid operated control system of the supply and waste type for maintaining a variable condition at a set value, the combination including a first fluid pressure system, a control couple therefor comprising a pair of relatively movable elements, one a ported element and the other a valve element, the ported element providing a vent for said system, means subject to variations in a variable condition for causing relative movement between the elements of the control couple, pressure fluid operated means to control the flow of a conditioning element, a second fluid pressure system connected to said pressure fluid operated means, a valve in said second system, a first pressure responsive device in said first system for operating said valve, a third fluid pressure system, a second pressure responsive device connected to said third system, fluid pressure operated means connected to said first system for controlling the pressure in said third system, a fourth fluid pressure system, a third pressure responsive device connected to said fourth system, said third and fourth systems being provided with vents, means connected to said first system for selectively controlling said vents, said fourth system having a second vent, and means operated by said last means for controlling said vent, said second and third responsive devices acting on said valve in opposite directions.

8. In a pressure fluid operated control system of the supply and waste type for maintaining a variable condition at a set value, the combination including a first fluid pressure system, a control couple therefor comprising a pair of relatively movable elements, one a ported element and the other a valve element, the ported element providing a vent for said system, means subject to variations in a variable condition for causing relative movement between the elements of the control couple, pressure fluid operated means to control the flow of a conditioning element, a second fluid pressure system connected to said pressure fluid operated means, a valve in said second system, a first pressure responsive device in said first system for operating said valve, a third fluid pressure system, a second pressure responsive device connected to said third system, fluid pressure operated means connected to said first system for controlling the pressure in said third system, a fourth fluid pressure system, a third pressure responsive device connected to said fourth system, and means connected to said first system for controlling the pressure in said fourth system, said second and third pressure responsive devices arranged to act on said valve in opposite directions, said second and third pressure responsive devices being connected to their respective systems through flow retarding devices.

9. In a pressure fluid operated control system of the supply and waste type for maintaining a variable condition at a set value by controlling the flow of a conditioning agent, the combination including a first fluid pressure system, a control couple therefor comprising a pair of relatively movable elements, one a ported element and the other a valve element, the ported element providing a vent for said system, means subject to variations in the variable condition for causing relative movement between the elements of the control couple, pressure fluid operated means to control the flow of conditioning agent, a second fluid pressure system connected to said pressure fluid operated means, a valve in said second system, a first pressure fluid responsive device in said first system for operating said valve, a third fluid pressure system, a second pressure responsive device connected to said third system, a fourth fluid pressure system, a third pressure responsive device connected to said fourth system, said third and fourth systems being provided with vents, means connected to said first system for selectively controlling said vents to control the pressure in said third and fourth systems, and means in the third and fourth systems between the respective pressure responsive devices and the vents for retarding the flow of pressure fluid to the pressure responsive devices.

10. In a control system for maintaining a variable condition at a set value by controlling the flow of a conditioning agent, the combination including motor actuated means for varying the flow of a conditioning agent, means for supplying energy to actuate said motor actuated means, means, including a control couple having a fixed and a movable member one being ported, responsive to variations of the condition from the set value for controlling said energy supplying means to alter the flow of the conditioning agent in a sense to oppose deviation of the condition from the set value, modifying means also controlled by said responsive means acting to operate the energy supplying means to increase or decrease the supply of energy to the motor means to return the condition to the set value, and selective means also controlled by said responsive means for determining whether the modifying means shall act to increase or decrease the supply of energy to said motor means.

11. In a pressure fluid operated control system of the supply and waste type for maintaining a variable condition at a set value by controlling the flow of a conditioning agent, a control couple comprising a pair of relatively movable elements, one a ported element and the other a variable element, means subject to variations in the variable condition from the set value for causing relative movement between the elements of the control couple, a pressure fluid system for which the ported element is a vent, pressure fluid operated means to control the flow of conditioning agent, a pressure fluid supply pipe connected to said pressure fluid operated means having a valve therein, a pressure responsive member connected to said system for operating said valve, a pair of pressure responsive members arranged to act on said valve to aid or oppose the action of the pressure responsive member thereon, and means subject to variation in the pressure in the system for predetermining which of said pair of members is energized, whereby the variable condition is returned to the set value for any demand of conditioning agent.

12. In a pressure fluid operated control system of the supply and waste type for controlling the flow of a conditioning agent, a control couple comprising a pair of elements one of which is fixed and the other of which is movable with respect thereto, one of said elements forming a nozzle and the other a valve therefor, means subject to deviations of the variable condition from the set value for causing movement of said movable element, a pressure fluid system for which said nozzle is a vent, pressure fluid operated means to control the flow of the conditioning agent, a pressure fluid supply pipe connected to said pressure fluid operated means having a valve therein, a pressure responsive member connected to said system for operating said valve, pressure responsive means acting on said valve and controlled by variations in pressure in said system to aid or oppose the pressure responsive member whereby for a substantially fixed pressure in said fluid pressure system the pressure in said pipe may have any value between zero and a maximum to meet all load demands of the conditioning agent.

13. In a pressure fluid operated control system for maintaining a variable condition at a set value by varying the flow of a conditioning agent, the combination including a primary pressure fluid system, means subject to variations of the variable condition from the set value for proportionally varying the pressure in said primary system, fluid pressure operated means for controlling the flow of a conditioning agent, a secondary pressure fluid system connected to said means and having a valve therein, pressure responsive means operated by the variations in pressure in said primary system for operating said valve, and a pair of pressure responsive members connected to said pressure responsive means for respectively operating it so as to operate said valve in opposite directions, said members responding to variations in the pressure in said primary system whereby for any load demand of conditioning agent the pressure in the secondary system will be such that the variable condition will return to the set value and the pressure in the primary system will return to a substantially fixed value.

ELMER H. HAMMOND.